United States Patent Office 3,432,391
Patented Mar. 11, 1969

3,432,391
ATTENUATED INFECTIOUS CANINE HEPATITIS LIVE VIRUS VACCINE AND METHOD OF PRODUCING SAME
Merlin B. Hays, Fort Dodge, Iowa, assignor to American Home Products Corporation, New York, N.Y., a corporation of Delaware
No Drawing. Filed Oct. 26, 1966, Ser. No. 589,504
U.S. Cl. 195—1.3          6 Claims
Int. Cl. C12k 7/00; A61k 23/00

This invention relates to compositions classified in the art of veterinary medicine as live virus vaccines, and to processes of producing them. More particularly, it relates, in its composition aspect, to an improved vaccine of great effectiveness and increased safety suitable for immunizing dogs against infectious canine hepatitis without provoking clinical symptom of the disease. In its process aspect, this invention relates to a new and highly efficient and economical process of making such a vaccine.

Infectious canine heptatis is a widely distributed disease of dogs, foxes, and wolves. The disease simulates canine distemper in many respects and was confused therewith for many years. In fact, it was only after immunization against canine distemper had became fairly routine that infectious canine hepatitis came to be recognized as a separate entity. It is now known that the disease is caused by a specific viral agent, and that infected animals shed this virus in the urine, by which means it is transmitted to non-immune contacts.

It has been found that the virulent virus of infectious canine hepatitis can be grown in in vitro tissue cultures of canine kidney cells, and that after many passages through such cells, the virus becomes modified or attenuated so that it no longer causes the usual clinical symptoms of the disease in their normal severity, though it does result in long-lasting immunity in vaccinated dogs.

It was also found that virulent infectious canine hepatitis virus which had been passaged a number of times through in vitro cultures of canine kidney cells had undergone another modification which made it able to grow in in vitro cultures of porcine kidney cells; without prior adaptation to in vitro cultured dog cells, the virus appears not to grow in in vitro cultured porcine kidney cells. It was further found that serial passage of the so adapted virus through successive portions of porcine kidney cells maintained as in vitro cultures resulted in further modification or attenuation of the virus to the extent that it was able, when injected into non-immune dogs, to confer long-lasting immunity without provoking clinical symptoms of the disease; furthermore, vaccinated dogs tended not to pass the virus to contacts, and the tendency of the virus to regain virulence by back-passage through dogs seemed to have been eliminated.

Vaccines based on the above described discoveries have come into widespread use, and the details of virus attenuation and vaccine preparation are disclosed in U.S. Patents 2,915,436, 3,000,788, and 3,155,589, and in numerous other scientific publications. These attenuated live virus vaccines of porcine tissue origin have proven very effective in the prevention of infectious canine hepatitis.

However, the use of porcine cells as the substrate for the production of vaccine is objectionable because of the danger that the porcine cells used in various production could have been derived from cholera infected swine, thus risking the introduction of hog cholera virus into cholera-free areas or the spreading of cholera where its incidence is being reduced by control measures in effect. This is not to say that commercial infectious canine hepatitis vaccines of porcine tissue culture origin contain hog cholera virus; so far as I am aware, this terrible kind of accident has not yet occurred, but the fact that it has not (if it is a fact) is largely a result of the extreme and costly safety testing preformed by the manufacturers. Although the use of slaughterhouse pig tissues would obviously be cheaper and more convenient, it is necessary to take care that the porcine cells used as substrate for production of infectious canine hepatitis virus come from cholera-free pigs. Additionally, before vaccine can be introduced into certain hog cholera-free parts of the world (e.g., Canada), it is necessary that samples of each production batch of vaccine be tested against cholera susceptible pigs. This kind of safety testing is very costly and time-consuming, and so adds materially to the manufacturing cost of such vaccines.

The prior art live vaccines for prevention of infectious canine heptatitis have suffered from another serious disadvantage in that they cause the condition known as "blue eye." It has long been observed that a certain proportion of dogs injected subcutaneously with infectious canine hepatitis attenuated virus vaccine of porcine cell exhibit the symptom known as "blue eye," which causes one or both eyes to turn blue and become either completely blind or at least of greatly reduced effectiveness. The condition is usually transient and disappears after a few days, but may occasionally persist much longer. Experience with these prior art vaccines has indicated that a blue eye incidence of about 4 or 5% is to be expected from their use. Tests made under conditions by one manufacturer of veterinary biologicals showed at 5.3% incidence of blue eye among dogs injected with the prior art vaccine.

It is accordingly an object of this invention to produce an attenuated live virus infectious canine hepatitis vaccine by a method completely free of the risk of contamination with hog cholera virus. A further object is to produce an attenuated live virus infectious canine hepatitis vaccine of greatly reduced tendency to produce "blue eye" in vaccinated dogs. Other objects of the invention will become apparent from the description which follows.

These and other objects of the invention are accomplished by allowing infectious canine hepatitis virus which has been fully attenuated by a number of serial passages through in vitro cultured canine cells followed by a number of passages through in vitro cultures of porcine kidney cells, to replicate and grow in in vitro cultures of bovine kidney cells, harvesting the virus laden fluids resulting therefrom, and producing therefrom a vaccine.

Starting virus for use in my invention may be produced by the process disclosed in Emery Patent No. 3,000,788. Commercial vaccines containing viruses produced by the general methods there disclosed are available and may be used if desired. If the commercial vaccine selected contains a plurality of viruses, it may be necessary first to eliminate all but the desired infectious canine hepatitis virus by treatment with the appropriate immune serum or serums. Since these methods of obtaining the needed starting virus are self-evident or well known to all versed in the virus vaccine art, it will be unnecessary to describe them further.

As above stated, bovine kidney cells are used in the present invention for the growth of attenuated infectious canine hepatitis virus. I may use cells derived from young or adult bovines, but I prefer to use kidney cells from bovine embryos. Bovine embryos are easily obtained when desired from slaughter houses. While either primary cell cultures or cell-line cultures may be used, I prefer to use primary cultures. As is well-known, the culture of cells in nutrient media may be conducted in any of several ways, including the suspended cell technique and the growing of confluent monolayers of cells on the wetted surfaces of tissue-culture flasks. I prefer the confluent monolayer techniques since in my experience they are considerably more convenient and economical; however, it is entirely feasible to adopt the principles of my invention to the use of suspended cell culture techniques.

While it is entirely practical to use the same nutrient solution for growth of the bovine kidney cells and for maintaining these cells while virus is being produced in them, I prefer to employ a serum-containing medium during the cell-growth phase of my process and then to replace this by a serum-free maintenance medium for the virus production phase. While it is possible in many cases to grow cells in vitro in the absence of serum, it is usually found that much more dependable and consistent results are obtained when the cell-growth nutrient medium contains serum, so I prefer to use serum-containing media for this phase of my process. On the other hand, serum appears to be quite unnecessary in the medium in which virus growth occurs, and there are real advantages in use of serum-free media in this phase. In this way it is possible to obtain a virus product almost entirely free of non-viral proteins, which means that the vaccines made therefrom are far less irritating and exhibit almost no tendency to cause foreign-protein reactions or precipitate anaphylactic shock.

Surprisingly, I have found it possible to secure several successive harvests of virus from a single lot of virus-infected bovine kidney cells simply by replacing the virus-laden maintenance fluid medium by fresh maintenance medium, incubating at virus-production temperature (about 35–38° C.) for a day or two, harvesting the fluid and replacing by fresh maintenance medium, etc.; the virus concentration of later harvests tends to be somewhat higher than in the first harvest. This is a very great advantage, since it reduces costs of labor, substrate cells, and seed virus.

For use in vaccine production, I preferably pool the virus from successive harvests from one or more cell monolayers for the sake of ease in processing and obtaining uniform products.

As is customary and well-known by now in the art of preparing ICH vaccine, I ordinarily freeze the virus harvests immediately after decanting from the monolayers of kidney cells in which they are produced and store them in frozen condition until ready to use them.

While the virus fluids as decanted from the inoculated and incubated cell sheets can be employed directly as vaccines without further treatment, it is often more desirable to combine them with other immunizing agents with which they are compatible to produce polyvalent vaccines. Thus highly effective bivalent vaccines are made by combining the vaccine virus of this invention with canine distemper virus produced in embryonated eggs or in vitro cultured cells of chick embryo, dog, or ferret origin. If desired, the vaccine viruses of this invention may be combined with killed or attenuated rabies virus and/or with leptospirosis immunogenic agents.

A particular advantage of vaccine viruses produced in accordance with this invention is their excellent stability to freeze-drying or lyophilization. Thus, while it is commonly assumed that virus titer may be reduced by a log or more by lyophilization, I usually find that the titer of this virus is reduced scarcely at all by such manipulation. Accordingly, only relatively small amounts of the infectious canine hepatitis virus made by my new method need to be used per dosage unit.

The following examples will illustrate the practise of my invention.

Preparation of bovine kidney cell monolayers

Bovine fetuses in the fourth to eighth month of gestation are obtained in utero from a nearby packing house. The fetuses are removed and liberally bathed with a dilute solution of chlorohexidine. The abdominal skin is dissected away and the exposed musculature flooded with the solution of chlorhexidine. Thereafter the abdominal musculature is aseptically removed to expose the kidneys which are removed and placed in sterile containers. Thereafter the cortical tissues are separated aseptically and minced into fragments of about one to two cubic millimeters.

These renal fragments are now rinsed several times with phosphate-buffered saline until the rinse fluid is essentially free of red blood cells, and then suspended in phosphate-buffered saline containing 0.25% trypsin. Trypsinization is continued for two to four hours at about 36° C. or for about 16–18 hours at 4° C., stirring to keep the tissue fragments in suspension.

The trypsinized cell suspension is then filtered through sterile gauze into centrifuge tubes and centrifuged at low speed (about 400 to 700 r.p.m.) for ten minutes. The supernatant fluid is decanted and the sedimented cells are resuspended in cell growth medium, and the concentration of viable cells estimated by the Trypan Blue method.

A wide variety of nutrient media suitable for cell growth are now available, and the selection of a particular one is largely a matter of convenience. I prefer to employ Earle's medium supplemented by lactalbumin hydrolyzate and containing about 4% of bovine or ovine serum. If desired, Earle's medium or No. 199 may be substituted for Earle's medium. In order to minimize the risk of bacterial contamination of the cell cultures, I make a practise of adding antibiotics to all cell-growth media and to the maintenance media with which the cells are flooded during virus production. I find a combination of penicillin G, dihydrostreptomycin and amphotericin B, at concentrations of $200\mu$, 200 mcgm., and 2 mcgm. per milliliter to be satisfactory, and it is intended that in all references herein to use of cell nutrient and cell maintenance media, it is to be understood that antibiotics at these concentrations are present. It is, of course, not critical that these particular antibiotics be used or that they be present in these particular concentrations. Those skilled in the art will recognize that many other antibiotics, singly or in combinations, may be used in place of these with essentially equivalent results.

As above indicated, I prefer to grow cells out into a confluent monolayer and allow virus to replicate in such cells. For this purpose Roux flasks or Vitex bottles are suitable. Thus I add about 300–400 ml. of nutrient solution to a 4 l. Vitex bottle and then add an amount of cell suspension to give a viable cell concentration of about 0.4 cc. of pack cells/100 ml. of medium. The cell culture is then allowed to stand at about 37–38° C. for three or four days, by which time a confluent monolayer of cells is produced.

The used cell nutrient medium is then poured off and discarded.

Two milliliters of commercial infectious canine hepatitis vaccine derived from and containing live virus which had been attenuated by repeated serial passages through in vitro cultures of canine kidney cells followed by several serial passages through in vitro cultures of porcine kidney cells was then pipetted onto the drained cell monolayer. (The virus preparation used was prepared by the process of U.S. Patent 3,000,788; its virus titer was about $10^{-6}$ to $10^{-7}$, which means, by the convention used throughout herein, that 0.2 ml. of the virus contained $10^6$–$10^7$ median tissue culture infective doses ($TCID_{50}$) when tested against in vitro cultured canine kidney cells.) After about one-half hour, the cells were covered with about 300 ml. of serum-free maintenance medium comprising medium 199 and lactalbumin hydrolyzate and antibiotics. The culture was then incubated at about 37° C. for two or three days. It was found on titration against canine kidney in virto cultured cells in the usual manner that the maintenance fluid now contained about $10^{4.5}$ $TCID_{50}$/0.2 ml.

A portion of this virus-containing maintenance medium was used to inoculate a fresh monolayer of bovine cells, with similar results. Serial passage through successive cultures of bovine cell monolayers was continued to a total of twelve passages. The maintenance fluid from the seventh passage was found to titer $10^{-6.6}$ TCID$_{50}$/0.2 ml.

Specimens of virus-containing maintenance fluid from the 4, 5, and 8 passages have been tested as vaccines and have been found to induce immunity to infectious canine hepatitis in non-immune dogs so that they withstood challenge with virulent virus without developing any clinical symptoms of the disease.

Accordingly, virus from any of the bovine cell passages from No. 4 to No. 8 may be used as vaccine to protect dogs from infectious canine hepatitis, and there is ample reason for assuming that a reasonable number of additional passages through bovine kidney cells would not have any effect, good or bad, on the virus.

The following table summarizes the herein described adaptation of infectious canine hepatitis virus (previously attenuated by serial passage through canine and porcine kidney cells) to bovine kidney cells, and the production of vaccine virus by culture of this adapted virus in these cells.

| Passage No. | Seed | Seed titer | Harvest No. | Titer of harvested fluids | Titer of dried vaccine | Dog protection, percent |
|---|---|---|---|---|---|---|
| 1 | Commercial ICH Vaccine Virus acc. to U.S. 3,000,788. | $10^{-5.0}$ | 1 | $10^{-4.5}$ | | |
| 2 | Harvest 1 Passage 1 | $10^{-4.5}$ | 1 | $10^{-4.5}$ | | |
|   |   |   | 2 | $10^{-5.0}$ | | |
| 3 | Harvest 2 Passage 2 | $10^{-5.0}$ | 1 | $10^{-4.0}$ | | |
|   |   |   | 2 | $10^{-5.0}$ | | |
|   |   |   | 3 | $10^{-4.5}$ | | |
| 4 | Harvest 2 Passage 3 | $10^{-5.0}$ | 1 | | | |
|   |   |   | 2 | $10^{-5.5}$ | $10^{-5.5}$ | 100 |
| 5 | Harvest 2 Passage 4 | $10^{-5.5}$ | 2 | $10^{-6.0}$ | $10^{-5.0}$ | 100 |
| 6 | Harvest 2 Passage 5 | $10^{-6.0}$ | 2 | $10^{-6.0}$ | | |
| 7 | Harvest 2 Passage 6 | $10^{-6.0}$ | 1 | $10^{-5.5}$ | ¹ $10^{-5.3}$ | 100 |
|   |   |   | 2 | $10^{-6.0}$ | | |
|   |   |   | 1 | $10^{-5.3}$ | | |
| 8 | Harvest 2 Passage 7 | $10^{-6.5}$ | 2 | $10^{-6.5}$ | ² $10^{-5.5}$ | 100 |
|   |   |   | 3 | $10^{-6.0}$ | | |

¹ Harvests 1 and 2 pooled.  ² Harvests 1, 2, and 3 pooled.

Vaccine produced by the process of this invention has been tested by subcutaneous administration to more than one hundred non-immune dogs ranging in age from three months to five months. All of these dogs developed immunity to infectious canine hepatitis as demonstrated by their complete non-response to challenge with virulent virus. In none of the dogs tested with vaccines of this invention has the vaccination resulted in fever, blue-eye, other sickness, or death.

Attenuated vaccine virus of this invention has been found to be compatible in storage and use with canine distemper modified live virus produced by virus growth in chick embryos or by growth in in vitro cultured canine kidney cell cultures. One hundred percent protection against both diseases has been achieved by use of bivalent vaccines made by combining the live modified canine hepatitis virus of this invention with live attenuated canine distemper virus.

In accordance with practise now generally followed in manufacture of infectious canine hepatitis vaccine, it is preferable to lyophilize the vaccine of this invention for greater convenience and stability in storage and distribution. Before use, the freeze-dried product is easily reconstituted by addition of a suitable diluent, such as sterile distilled water or a saline solution.

The amount of virus used to immunize a dog may vary between wide limits, as is usually the case with a live virus vaccine. I find that 0.04 ml. of virus-containing fluid produced as above described is a satisfactory dosage for immunizing non-immune dogs; I have used as little as 0.00004 ml. (suitably diluted for convenience of administration) and still obtained complete protection. Dosages much larger than 0.04 ml. are effective and without bad effects, but there appears to be no advantage in use of excessive amounts.

What is claimed is:

1. A method of producing a modified live virus vaccine capable of protecting non-immune dogs from infectious canine hepatitis which comprises the steps of (1) growing a culture of bovine kidney cells in a nutrient medium capable of supporting in vitro growth of said cells; (2) inoculating said cell culture with an infectious canine hepatitis virus which has been attenuated by repeated passages through in vitro tissue cultured cells of canine and porcine origin until it is no longer capable of causing the development of clinical symptoms of infectious canine hepatitis when injected subcutaneously into susceptible dogs while still provoking the production of protective antibodies in said dogs and providing long-lasting immunity in said dogs against infectious canine hepatitis; (3) incubating said inoculated cell culture at a temperature of about 35–38° C. in the presence of a liquid nutrient medium capable of maintaining said cells in viable condition until said liquid medium contains infectious canine hepatitis virus at a titer of at least $10^{-4}$ TCID$_{50}$ as titrated against tissue cultured canine kidney cells; (4) harvesting the virus so produced; (5) inoculating therewith a fresh culture of bovine kidney cells; (6) repeating the passage of virus through bovine cells to a total of at least about four passages; and (7) recovering a virus-containing fluid capable of serving as a vaccine.

2. A process according to claim 1 in which the bovine kidney cells are grown out into a confluent cell monolayer.

3. A process according to claim 2 in which the inoculated cell monolayer is incubated in the presence of a serum-free maintenance medium.

4. A process according to claim 2 in which successive harvests of virus-containing fluids are recovered from the inoculated cell monolayer.

5. A process according to claim 1 in which the harvested virus-containing fluid is lyophilized to prepare a reconstitutable vaccine.

6. An infectious canine hepatitis vaccine produced by the process of claim 1.

References Cited

UNITED STATES PATENTS

| 2,915,436 | 12/1959 | Fieldsteel | 195—1.3 |
| 3,000,788 | 9/1961 | Emery | 195—1.3 |
| 3,399,113 | 8/1968 | Cabasso | 195—1.3 |

LEWIS GOTTS, *Primary Examiner.*

S. K. ROSE, *Assistant Examiner.*

U.S. Cl. X.R.

424—93

UNITED STATES PATENT OFFICE
CERTIFICATE OF CORRECTION

Patent No. 3,432,391                                  March 11, 1969

Merlin B. Hays

It is certified that error appears in the above identified patent and that said Letters Patent are hereby corrected as shown below:

Column 1, line 21, "heptatis" should read -- hepatitis --; line 66, "various" should read -- virus --. Column 2, line 4, "preformed" should read -- performed --; line 22, after "cell" insert -- origin --; line 29, after "under" insert -- controlled --; line 31, "at" should read -- a --. Column 4, line 24, "Earle's" should read -- Eagle's --; line 69, "virto" should read -- vitro --.

Signed and sealed this 7th day of April 1970.

(SEAL)
Attest:

Edward M. Fletcher, Jr.                          WILLIAM E. SCHUYLER, JR.
Attesting Officer                                      Commissioner of Patents